(12) United States Patent
Gauthier

(10) Patent No.: US 7,333,233 B2
(45) Date of Patent: *Feb. 19, 2008

(54) METHOD OF UTILIZING VARIABLE DATA FIELDS WITH A PAGE DESCRIPTION LANGUAGE

(75) Inventor: Forrest P. Gauthier, Maineville, OH (US)

(73) Assignee: Tesseron Ltd., Cincinnati, OH (US)

( * ) Notice: Subject to any disclaimer, the term of this patent is extended or adjusted under 35 U.S.C. 154(b) by 264 days.

This patent is subject to a terminal disclaimer.

(21) Appl. No.: 10/707,920

(22) Filed: Jan. 26, 2004

(65) Prior Publication Data

US 2004/0141197 A1 Jul. 22, 2004

Related U.S. Application Data

(60) Continuation of application No. 10/090,529, filed on Mar. 1, 2002, now Pat. No. 6,687,016, which is a division of application No. 09/299,502, filed on Apr. 26, 1999, now Pat. No. 6,381,028, which is a continuation of application No. 08/896,899, filed on Jul. 18, 1997, now Pat. No. 5,937,153, which is a continuation-in-part of application No. 08/373,582, filed on Jan. 18, 1995, now Pat. No. 5,729,665.

(51) Int. Cl.
*G06F 15/00* (2006.01)

(52) U.S. Cl. .................................... 358/1.18; 358/1.12

(58) Field of Classification Search ................ 358/1.1, 358/1.5, 1.7, 1.9, 1.12, 1.13, 1.14, 1.18, 1.11, 358/448, 467, 470, 1.15; 382/164, 191, 318

See application file for complete search history.

(56) References Cited

U.S. PATENT DOCUMENTS 3,576,367 A 4/1971 Sable (Continued)

FOREIGN PATENT DOCUMENTS

CA 2210405 7/1996

(Continued)

OTHER PUBLICATIONS

IDG InfoWorld, Oct. 9, 1995, Review, p. 91, IDG Communications, Inc., U.S.A.

(Continued)

*Primary Examiner*—Gabriel I. Garcia
(74) *Attorney, Agent, or Firm*—MacMillan, Sobanski & Todd, LLC

(57) ABSTRACT

A computer implemented method for generating a bitmap suitable for high-speed variable printing, comprising the steps of: (a) providing a page description language file, the page description language file defining at least one variable data area and at least one static data area; (b) interpreting the page description language file, and during the interpreting step: (i) generating a static bitmap of the static data area, (ii) identifying the variable data area, and (iii) responsive to the identification of the variable data area, not adding a bitmap of the variable data area to the static bitmap; and (c) saving the static bitmap, whereby the saved static bitmap is used repeatedly in the generation of a plurality of documents, each of which contain the static bitmap and a variable data bitmap.

14 Claims, 2 Drawing Sheets

U.S. PATENT DOCUMENTS

| | | |
|---|---|---|
| 3,744,899 A | 7/1973 | Sable |
| 4,085,445 A | 4/1978 | Blevins et al. |
| 4,203,154 A | 5/1980 | Lampson et al. |
| 4,250,976 A | 2/1981 | Mochida |
| 4,268,164 A | 5/1981 | Yajima et al. |
| 4,300,206 A | 11/1981 | Belleson et al. |
| 4,314,357 A | 2/1982 | Kimura et al. |
| 4,322,157 A | 3/1982 | Miura et al. |
| 4,417,322 A | 11/1983 | Berry et al. |
| 4,441,829 A | 4/1984 | Hebert, Jr. et al. |
| 4,445,795 A | 5/1984 | Levine et al. |
| 4,454,576 A | 6/1984 | McInroy et al. |
| 4,460,975 A | 7/1984 | Torkelsen et al. |
| 4,470,129 A | 9/1984 | Disbrow et al. |
| 4,493,049 A | 1/1985 | Donohue et al. |
| 4,509,826 A | 4/1985 | Araghi |
| 4,539,653 A | 9/1985 | Bartlett et al. |
| 4,553,860 A | 11/1985 | Imaizumi et al. |
| 4,651,278 A | 3/1987 | Herzog et al. |
| 4,677,551 A | 3/1987 | Suganuma |
| 4,718,784 A | 1/1988 | Drisko |
| 4,723,209 A | 2/1988 | Hernandez et al. |
| 4,723,210 A | 2/1988 | Barker et al. |
| 4,723,211 A | 2/1988 | Barker et al. |
| 4,739,477 A | 4/1988 | Barker et al. |
| 4,745,415 A | 5/1988 | Konda et al. |
| 4,745,560 A | 5/1988 | Decker et al. |
| 4,770,972 A | 9/1988 | Nelson et al. |
| 4,771,340 A | 9/1988 | Notermans |
| 4,809,220 A | 2/1989 | Carlson et al. |
| 4,825,251 A | 4/1989 | Nelson et al. |
| 4,826,333 A | 5/1989 | Tanaka |
| 4,839,814 A | 6/1989 | Steidel |
| 4,857,955 A | 8/1989 | Crandall |
| 4,862,386 A | 8/1989 | Axelrod et al. |
| 4,864,516 A | 9/1989 | Gaither et al. |
| 4,870,611 A | 9/1989 | Martin et al. |
| 4,903,067 A | 2/1990 | Murayama et al. |
| 4,903,229 A | 2/1990 | Schmidt et al. |
| 4,912,491 A | 3/1990 | Hoshino et al. |
| 4,933,880 A | 6/1990 | Borgendale et al. |
| 4,937,664 A | 6/1990 | Chiku |
| 4,939,674 A | 7/1990 | Price et al. |
| 4,944,614 A * | 7/1990 | Tanaka ........................ 400/68 |
| 4,953,105 A | 8/1990 | Hirata |
| 4,959,769 A | 9/1990 | Cooper et al. |
| 4,963,459 A | 10/1990 | Beery et al. |
| 4,963,899 A | 10/1990 | Resch, III |
| 4,965,597 A | 10/1990 | Ohigashi et al. |
| 4,965,748 A | 10/1990 | Chang et al. |
| 4,969,093 A | 11/1990 | Barker et al. |
| 4,992,956 A | 2/1991 | Kaku et al. |
| 4,994,968 A | 2/1991 | Kato et al. |
| 4,996,662 A | 2/1991 | Cooper et al. |
| 5,001,653 A | 3/1991 | Buchanan et al. |
| 5,021,975 A | 6/1991 | Yamanashi |
| 5,025,396 A | 6/1991 | Parks et al. |
| 5,029,327 A | 7/1991 | Nureki |
| 5,033,009 A | 7/1991 | Dubnoff |
| 5,043,749 A | 8/1991 | Punater et al. |
| 5,050,101 A | 9/1991 | Kiuchi et al. |
| 5,060,980 A | 10/1991 | Johnson et al. |
| 5,067,024 A | 11/1991 | Anzai |
| 5,077,795 A | 12/1991 | Rourke et al. |
| 5,078,748 A | 1/1992 | Akram et al. |
| 5,084,831 A | 1/1992 | Morikawa et al. |
| 5,103,490 A * | 4/1992 | McMillin ................... 382/284 |
| 5,104,245 A | 4/1992 | Oguri et al. |
| 5,107,423 A | 4/1992 | Sasaki et al. |
| 5,134,669 A | 7/1992 | Keogh et al. |
| 5,136,316 A | 8/1992 | Punater et al. |
| 5,139,003 A | 8/1992 | Ohhashi et al. |
| 5,142,667 A | 8/1992 | Dimperio et al. |
| 5,143,362 A | 9/1992 | Doane et al. |
| 5,148,366 A | 9/1992 | Buchanan et al. |
| 5,150,455 A | 9/1992 | Morikawa et al. |
| 5,157,765 A | 10/1992 | Birk et al. |
| 5,157,767 A | 10/1992 | Nihei |
| 5,157,773 A | 10/1992 | Matsumoto et al. |
| 5,173,853 A | 12/1992 | Kelly et al. |
| 5,181,162 A | 1/1993 | Smith et al. |
| 5,191,429 A | 3/1993 | Rourke |
| 5,202,206 A | 4/1993 | Tam |
| 5,204,916 A | 4/1993 | Hamilton, Jr. et al. |
| 5,204,946 A | 4/1993 | Shimamura |
| 5,206,951 A | 4/1993 | Khoyi et al. |
| 5,208,906 A | 5/1993 | Morgan |
| 5,218,539 A | 6/1993 | Elphick et al. |
| 5,222,211 A | 6/1993 | Mueller |
| 5,222,235 A | 6/1993 | Hintz et al. |
| 5,222,236 A | 6/1993 | Potash et al. |
| 5,226,161 A | 7/1993 | Khoyi et al. |
| 5,231,698 A | 7/1993 | Forcier |
| 5,235,654 A | 8/1993 | Anderson et al. |
| 5,237,655 A | 8/1993 | Statt et al. |
| 5,239,625 A | 8/1993 | Bogart et al. |
| 5,241,464 A | 8/1993 | Greulich et al. |
| 5,243,518 A | 9/1993 | Holt et al. |
| 5,257,097 A | 10/1993 | Pineau et al. |
| 5,261,047 A | 11/1993 | Rivshin |
| 5,267,155 A | 11/1993 | Buchanan |
| 5,276,799 A | 1/1994 | Rivshin |
| 5,280,574 A | 1/1994 | Mizuta et al. |
| 5,282,269 A | 1/1994 | Willems et al. |
| 5,287,128 A | 2/1994 | Doane et al. |
| 5,287,444 A | 2/1994 | Enescu et al. |
| 5,290,109 A | 3/1994 | Midorikawa |
| 5,291,243 A | 3/1994 | Heckman et al. |
| 5,297,217 A | 3/1994 | Hamilton, Jr. et al. |
| 5,303,341 A | 4/1994 | Rivshin |
| 5,303,379 A | 4/1994 | Khoyi et al. |
| 5,307,266 A | 4/1994 | Hayashi et al. |
| 5,307,458 A | 4/1994 | Freiburg et al. |
| 5,309,558 A | 5/1994 | Rourke et al. |
| 5,315,693 A | 5/1994 | Hirosawa et al. |
| 5,317,646 A | 5/1994 | Sang, Jr. et al. |
| 5,319,748 A | 6/1994 | Motoyama |
| 5,323,217 A | 6/1994 | Christy et al. |
| 5,323,312 A | 6/1994 | Saito et al. |
| 5,325,484 A | 6/1994 | Motoyama |
| 5,327,341 A | 7/1994 | Whalen et al. |
| 5,328,092 A | 7/1994 | File |
| 5,329,616 A | 7/1994 | Silverbrook |
| 5,339,240 A | 8/1994 | Beaverson |
| 5,349,647 A | 9/1994 | Freiburg et al. |
| 5,353,388 A | 10/1994 | Motoyama |
| 5,355,493 A | 10/1994 | Silberbauer et al. |
| 5,360,277 A | 11/1994 | Matsubara et al. |
| 5,367,673 A | 11/1994 | Goldsmith et al. |
| 5,368,334 A | 11/1994 | Christy et al. |
| 5,375,204 A | 12/1994 | Motoyama et al. |
| 5,379,368 A | 1/1995 | Imai et al. |
| 5,379,373 A | 1/1995 | Hayashi et al. |
| 5,384,886 A | 1/1995 | Rourke |
| 5,384,901 A | 1/1995 | Glassner et al. |
| 5,404,294 A | 4/1995 | Karnik |
| 5,412,566 A | 5/1995 | Sawa |
| 5,416,849 A | 5/1995 | Huang |
| 5,416,896 A | 5/1995 | Motoyama |
| 5,420,696 A | 5/1995 | Wegeng et al. |
| 5,420,974 A | 5/1995 | Morris et al. |
| 5,421,015 A | 5/1995 | Khoyi et al. |
| 5,422,992 A | 6/1995 | Motoyama et al. |
| 5,425,140 A | 6/1995 | Bloomfield et al. |

| | | | | | | |
|---|---|---|---|---|---|---|
| 5,436,627 A | 7/1995 | Motoyama et al. | | 5,765,006 A | 6/1998 | Motoyama |
| 5,437,038 A | 7/1995 | Silberbauer et al. | | 5,765,874 A | 6/1998 | Chanenson et al. |
| 5,438,650 A | 8/1995 | Motoyama et al. | | 5,768,488 A | 6/1998 | Stone et al. |
| 5,440,745 A | 8/1995 | Platte et al. | | 5,778,377 A | 7/1998 | Marlin et al. |
| 5,446,837 A | 8/1995 | Motoyama et al. | | 5,781,711 A | 7/1998 | Austin et al. |
| 5,446,842 A | 8/1995 | Schaeffer et al. | | 5,793,946 A | 8/1998 | Gauthier et al. |
| 5,448,685 A | 9/1995 | Ogura et al. | | 5,796,411 A | 8/1998 | Cyman et al. |
| 5,448,691 A | 9/1995 | Motoyama | | 5,796,930 A | 8/1998 | Gauthier et al. |
| 5,450,537 A | 9/1995 | Hirai et al. | | 5,801,716 A | 9/1998 | Silverbrook |
| 5,450,541 A | 9/1995 | Rourke et al. | | 5,832,530 A | 11/1998 | Paknad et al. |
| 5,451,111 A | 9/1995 | Matsuhisa | | 5,833,375 A | 11/1998 | Gauthier et al. |
| 5,452,094 A | 9/1995 | Ebner et al. | | 5,841,420 A | 11/1998 | Kaply et al. |
| 5,455,599 A | 10/1995 | Cabral et al. | | 5,852,673 A * | 12/1998 | Young ........................ 382/164 |
| 5,455,945 A | 10/1995 | VanderDrift | | 5,866,286 A | 2/1999 | Christy et al. |
| 5,458,284 A | 10/1995 | Haan et al. | | 5,877,865 A | 3/1999 | Fukuta |
| 5,459,819 A | 10/1995 | Watkins et al. | | 5,880,742 A | 3/1999 | Rao et al. |
| 5,459,826 A | 10/1995 | Archibald | | 5,895,455 A | 4/1999 | Bellinger et al. |
| 5,465,165 A | 11/1995 | Tanio et al. | | 5,896,462 A | 4/1999 | Stern |
| 5,467,448 A | 11/1995 | Hilton et al. | | 5,900,003 A | 5/1999 | Ben Dror |
| 5,483,623 A | 1/1996 | Nagashima | | 5,915,258 A | 6/1999 | Toyokura |
| 5,483,624 A | 1/1996 | Christopher et al. | | 5,920,685 A | 7/1999 | Romano et al. |
| 5,483,629 A | 1/1996 | Motoyama et al. | | 5,926,185 A * | 7/1999 | Vyncke et al. .............. 345/619 |
| 5,487,165 A | 1/1996 | Tsay et al. | | 5,937,153 A * | 8/1999 | Gauthier ..................... 358/1.17 |
| 5,490,243 A | 2/1996 | Millman et al. | | 5,946,461 A | 8/1999 | Landry et al. |
| 5,493,634 A | 2/1996 | Bonk et al. | | 5,949,438 A | 9/1999 | Cyman et al. |
| 5,495,565 A | 2/1996 | Millard et al. | | 5,953,007 A | 9/1999 | Center et al. |
| 5,499,329 A | 3/1996 | Motoyama et al. | | 5,960,164 A | 9/1999 | Dorfman et al. |
| 5,500,928 A | 3/1996 | Cook et al. | | 5,963,968 A | 10/1999 | Warmus et al. |
| 5,502,796 A | 3/1996 | Takahashi | | 5,982,994 A | 11/1999 | Mori et al. |
| 5,504,843 A | 4/1996 | Catapano et al. | | 5,983,243 A | 11/1999 | Heiney et al. |
| 5,504,891 A | 4/1996 | Motoyama et al. | | 5,987,461 A | 11/1999 | Dreyer et al. |
| 5,506,697 A | 4/1996 | Li et al. | | 6,006,242 A | 12/1999 | Poole et al. |
| 5,506,985 A | 4/1996 | Motoyama et al. | | 6,006,281 A | 12/1999 | Edmunds |
| 5,521,710 A | 5/1996 | Strossman et al. | | 6,009,442 A | 12/1999 | Chen et al. |
| 5,532,100 A | 7/1996 | Christy et al. | | 6,016,380 A * | 1/2000 | Norton ........................ 386/52 |
| 5,535,318 A | 7/1996 | Motoyama et al. | | 6,018,774 A | 1/2000 | Mayle et al. |
| 5,539,529 A | 7/1996 | Merchant | | 6,020,894 A | 2/2000 | Silverbrook |
| 5,542,052 A | 7/1996 | Deutsch et al. | | 6,027,195 A | 2/2000 | Gauthier et al. |
| 5,544,287 A | 8/1996 | Roth | | 6,049,390 A | 4/2000 | Notredame et al. |
| 5,546,577 A | 8/1996 | Marlin et al. | | 6,064,397 A * | 5/2000 | Herregods et al. .......... 345/630 |
| 5,548,687 A | 8/1996 | Motoyama | | 6,078,403 A | 6/2000 | Palmer |
| 5,559,933 A | 9/1996 | Boswell | | 6,078,406 A | 6/2000 | Nickerson |
| 5,563,987 A | 10/1996 | Scott et al. | | 6,145,946 A | 11/2000 | Gauthier et al. |
| 5,563,998 A | 10/1996 | Yaksich et al. | | 6,146,027 A | 11/2000 | Orton et al. |
| 5,563,999 A | 10/1996 | Yaksich et al. | | 6,209,010 B1 | 3/2001 | Gauthier et al. |
| 5,587,800 A | 12/1996 | Miyazaki | | 6,236,463 B1 | 5/2001 | Cyman et al. |
| 5,592,683 A | 1/1997 | Chen et al. | | 6,243,172 B1 | 6/2001 | Gauthier et al. |
| 5,594,860 A | 1/1997 | Gauthier | | 6,290,406 B1 | 9/2001 | Gauthier et al. |
| 5,600,768 A | 2/1997 | Andresen | | 6,292,267 B1 | 9/2001 | Mori et al. |
| 5,611,024 A | 3/1997 | Campbell et al. | | 6,310,695 B1 | 10/2001 | Gauthier et al. |
| 5,611,035 A | 3/1997 | Hall | | 6,326,983 B1 | 12/2001 | Venable et al. |
| 5,615,316 A | 3/1997 | Imai et al. | | 6,327,599 B1 | 12/2001 | Warmus et al. |
| 5,621,020 A | 5/1997 | Khatib et al. | | 6,330,073 B1 | 12/2001 | Sciatto |
| 5,634,091 A | 5/1997 | Sands et al. | | 6,332,149 B1 | 12/2001 | Warmus et al. |
| 5,640,559 A | 6/1997 | Silberbauer et al. | | 6,381,028 B1* | 4/2002 | Gauthier ..................... 358/1.11 |
| 5,640,577 A | 6/1997 | Scharmer | | 6,437,875 B1 | 8/2002 | Unno |
| 5,642,435 A | 6/1997 | Loris | | 6,446,100 B1 | 9/2002 | Warmus et al. |
| 5,668,897 A | 9/1997 | Stolfo | | 6,459,498 B1 | 10/2002 | Miyake et al. |
| 5,671,345 A | 9/1997 | Lhotak | | 6,465,165 B2 | 10/2002 | Landry-Coltrain et al. |
| 5,675,788 A | 10/1997 | Husick et al. | | 6,487,568 B1 | 11/2002 | Gauthier et al. |
| 5,680,615 A | 10/1997 | Marlin et al. | | 6,493,106 B1 | 12/2002 | Gauthier et al. |
| 5,689,625 A | 11/1997 | Austin et al. | | 6,505,980 B1 | 1/2003 | Allday |
| 5,706,365 A | 1/1998 | Rangarajan et al. | | 6,557,017 B1 | 4/2003 | Venable |
| 5,717,840 A | 2/1998 | Pardo | | 6,597,467 B2 | 7/2003 | Miyake et al. |
| 5,727,220 A | 3/1998 | Hohensee et al. | | 6,599,325 B2 | 7/2003 | Gauthier et al. |
| 5,729,665 A * | 3/1998 | Gauthier ..................... 358/1.18 | | 6,684,188 B1 | 1/2004 | Mitchell et al. |
| 5,729,674 A | 3/1998 | Rosewarne et al. | | 6,687,016 B2 | 2/2004 | Gauthier |
| 5,734,915 A | 3/1998 | Roewer | | 6,707,572 B1 | 3/2004 | Walker et al. |
| 5,740,338 A | 4/1998 | Gauthier et al. | | 6,771,387 B2 | 8/2004 | Gauthier et al. |
| 5,745,910 A | 4/1998 | Piersol et al. | | 2002/0089681 A1 | 7/2002 | Gauthier |
| 5,754,750 A | 5/1998 | Butterfield et al. | | 2002/0122205 A1 | 9/2002 | Gauthier |
| 5,758,074 A | 5/1998 | Marlin et al. | | 2002/0149792 A1 | 10/2002 | Gauthier et al. |
| 5,760,914 A | 6/1998 | Gauthier et al. | | 2003/0050934 A1 | 3/2003 | Gauthier et al. |

| | | | |
|---|---|---|---|
| 2004/0130752 A1 | 7/2004 | Gauthier | |
| 2004/0141197 A1 | 7/2004 | Gauthier | |
| 2005/0076001 A1 | 4/2005 | Gauthier et al. | |
| 2005/0185212 A1 | 8/2005 | Gauthier | |
| 2005/0286065 A1 | 12/2005 | Gauthier et al. | |

FOREIGN PATENT DOCUMENTS

| | | |
|---|---|---|
| CA | 2207840 | 12/1997 |
| CA | 2215094 | 4/1998 |
| DE | 4313958 A1 | 11/1993 |
| DE | 4313959 A1 | 11/1993 |
| DE | 4316282 A1 | 11/1994 |
| DE | 4313958 C2 | 8/1998 |
| DE | 4313959 C2 | 8/1998 |
| EP | 0075732 A2 | 4/1983 |
| EP | 0131966 A2 | 1/1985 |
| EP | 0075732 B1 | 8/1987 |
| EP | 0131966 B1 | 3/1990 |
| EP | 0394168 A2 | 10/1990 |
| EP | 0475601 A2 | 3/1992 |
| EP | 0478335 A2 | 4/1992 |
| EP | 0527097 A2 | 2/1993 |
| EP | 0527097 A2 | 2/1993 |
| EP | 0538059 A2 | 4/1993 |
| EP | 0539135 A2 | 4/1993 |
| EP | 0539135 A2 | 4/1993 |
| EP | 0539135 A3 | 7/1993 |
| EP | 0594370 A1 | 4/1994 |
| EP | 0614156 A1 | 9/1994 |
| EP | 0527097 A3 | 3/1995 |
| EP | 0703524 A1 | 3/1996 |
| EP | 0703524 B1 | 1/1997 |
| EP | 0394168 B1 | 6/1997 |
| EP | 0 703 524 B1 | 8/1997 |
| EP | 0475601 B1 | 10/1997 |
| EP | 0539135 B1 | 12/1997 |
| EP | 0837401 A2 | 4/1998 |
| EP | 0538059 B1 | 4/1999 |
| EP | 0594370 B1 | 1/2000 |
| EP | 1011981 A1 | 6/2000 |
| EP | 1132809 A2 | 9/2001 |
| EP | 0837401 B1 | 2/2003 |
| EP | 1132809 B1 | 1/2004 |
| GB | 2220511 A | 1/1990 |
| JP | 56157369 A | 12/1981 |
| JP | 58108045 A | 6/1983 |
| JP | 58224755 A | 12/1983 |
| JP | 59068244 A | 4/1984 |
| JP | 59068277 A | 4/1984 |
| JP | 60073869 A | 4/1985 |
| JP | 60145865 A | 8/1985 |
| JP | 61018802 A | 1/1986 |
| JP | 61118775 A | 6/1986 |
| JP | 61130067 A | 6/1986 |
| JP | 61179463 A | 8/1986 |
| JP | 61223935 A | 10/1986 |
| JP | 61254369 A | 11/1986 |
| JP | 62065126 A | 3/1987 |
| JP | 62207664 A | 9/1987 |
| JP | 62261467 A | 11/1987 |
| JP | 63039085 A | 2/1988 |
| JP | 63108428 A | 5/1988 |
| JP | 63271275 A | 11/1988 |
| JP | 63300259 A | 12/1988 |
| JP | 63300260 A | 12/1988 |
| JP | 63300263 A | 12/1988 |
| JP | 1133051 A | 5/1989 |
| JP | 1141746 A | 6/1989 |
| JP | 1142674 A | 6/1989 |
| JP | 1142675 A | 6/1989 |
| JP | 1142680 A | 6/1989 |
| JP | 2112017 A | 4/1990 |
| JP | 3091064 A | 4/1991 |
| JP | 3121870 A | 5/1991 |
| JP | 4059372 A | 2/1992 |
| JP | 5016450 A | 1/1993 |
| JP | 5031997 A | 2/1993 |
| JP | 5057967 A | 3/1993 |
| JP | 5119937 A | 5/1993 |
| JP | 5246104 A | 9/1993 |
| JP | 5270093 A | 10/1993 |
| JP | 5298037 A | 11/1993 |
| JP | 5338313 A | 12/1993 |
| JP | 6032015 A | 2/1994 |
| JP | 6035632 A | 2/1994 |
| JP | 6099635 A | 4/1994 |
| JP | 6106810 A | 4/1994 |
| JP | 6125454 A | 5/1994 |
| JP | 6171176 A | 6/1994 |
| JP | 6171177 A | 6/1994 |
| JP | 6238982 A | 8/1994 |
| JP | 6340129 A | 12/1994 |
| JP | 7064981 A | 3/1995 |
| JP | 3048582 B2 | 3/2000 |
| WO | WO9502224 A1 | 1/1995 |
| WO | WO9622573 A1 | 7/1996 |
| WO | WO9718514 A1 | 5/1997 |
| WO | WO98/081176 | 2/1998 |
| WO | WO9808176 A1 | 2/1998 |
| WO | WO9821044 A1 | 5/1998 |
| WO | WO0028435 A2 | 5/2000 |
| WO | WO0028435 A3 | 10/2000 |

OTHER PUBLICATIONS

IDG InfoWorld, Mar. 20, 1995, Product Reviews; Desktop publishing software; p. 92, IDG Communications, Inc., U.S.A.

IDG InfoWorld, May 9, 1994, Reviews: p. 98, IDG Coummunications, Inc., U.S.A.

Xerox Corp. 9700 Electronic Printing System, El Segundo, California Jan. 1982.

Xerox Corp. 9700 Laser Printing System Operator Guide, El Segundo, California, Dec. 1987.

Xerox Corp. Xerox Generic Format ("XGF") Command Set for DocriPrint. Version 1.2. Jul. 1, 1993.

New High Speed Vans RIP Features Variable PostScript. The Hard Copy Observer, vol. 7, No. 2. Feb. 1997.

Spring, Michael B. and Dubin, David S. Hands-On PostScript. 1992.

Spring, Michael B. Electronic Printing and Publishing: The Document Processing Revolution. 1991.

Vollenweider, Peter. Encapsulated postScript: Application Guide for the Macintosh and PC's. 1990.

Wikipedia—The Free Encyclopedia. Definition of "Display Write".

Xerox Corp. 9700-8700 Electronic Printing Systems Version 10 Software Advance Notice, Mike Muttera, El Segundo, California Oct. 18, 1984.

Xerox Corp. 9700-8790 Laser Printing Systems Print Description Language Reference Version 3.9 Feb. 1994.

Xerox Corp. 9700 Electronic Printing System forms Creation Guide 910001C Jan. 1979, El Segundo, California Jun. 1977.

Xerox Corp. 9700 Electronic Printing System Forms Creation Guide, El Segundo, California Jun. 1977.

Xerox Corp. 9700 Electronic Printing System Operator's Guide 600P81096-B, El Segundo, California.

Xerox Corp. Interpress Electronic Printing Standard Jan. 1986.

Holzgang, David A. Understanding PostScript Programming. 1st edition. 1987. pp. 196-209, 210-225, 226-241 & 242-262.

Holzgang, David A. Understanding PostScript Programming. 2nd edition. 1988.

Holzgang, David A. Understanding PostScript. 3nd edition. 1992.

Introduction to Interscript. Sep. 19, 1985.

On the Supply Side. Editor and Publisher for Jul. 21, 1984.

Ricoh Company Ltd. Special Issue on Pattern Recognition and Natural Language Processing. Ricoh Technical Report. No. 15. 1986.
Roth, Stephen F. Real World PostScript: Techniques from PostScript Professionals. 1988. pp. 228-384.
Xerox Corp. 9700 Electronic Printing System Press Information, El Segundo, California.
Xerox Corp. 9700 Electronic Printing System Reference Manual (Preliminary), El Segundo, California Jun. 1977.
Xerox Corp. 9700 Electronic Printing System, El Segundo, California Jan. 1981.
Xerox Corp. 9700 Electronic Printing System, Horizontal-Vertical Printing Characters, El Segundo, California.
Xerox Corp. 9700 Electronic Printing System, The Leading Edge in Information Management, El Segundo, California, Feb. 1982.
Xerox Corp. 9700 Electronic Printing System, The Leading Edge in Information Management, El Segundo, California, Jul. 1983.
Xerox Corp. 9700 Electronic Printing System, The Leading Edge in Information Management, El Segundo, California.
Xerox Corp. 9700 Forms Description Language self-Study Module, El Segundo, California Jan. 1979.
Xerox Corp. 9700 Laser Printing System Operator Guide, El Segundo, California, jan. 1986. pp. I-V.
Xerox Corp. 9700 Reference Manual, Input Processing Functions pp. 4-8—4-37.
Xerox Corp. Command Set for ZK.B—Docuprint 390 Application. Version 1.0. Dec. 14, 1992.
Xerox Corp. Electronic Printing Systems 8700 9700 Model V, El Segundo, California.
Xerox Corp. Examples of Documents Electronically Created by the Xerox 9700.
Xerox Corp. Interpress Electronic Printing Standard Version 2.1 Apr. 1984.
Xerox Corp. Interpress, The Document and Page Description Language for Performance Printing, El Segundo, California, May 1986.
Xerox Corp. News from Xerox Corporation, nineteen companies Plan to Use Common Printing Standard for Computers.
Xerox Corp. News from Xerox Corporation, Xerox Announces Extension of Interpress Printing Architecture.
Xerox Corp. News from Xerox Corporation, Xerox Announces Interpress Printing Architecture.
Xerox Corp. News from Xerox Corporation, xerox offers enhanced 9700 and 8700 electronic printers with improved printing quality.
Xerox Corp. System Intergration Guide, Interpress 82 Electronic Printing Standard Jan. 1982.
GMC Digital Systems AG. PrintNet PrintLayout 11 Operating Manual. Jul. 4, 1994.
GMC Digital Systems AG. PrintNet printLayout V2.1 Operating Manual. Oct. 26, 1994.
GMC Digital Systems AG. PrintNet PrintJob V2.02 User Manual. Oct. 26, 1993.
GMC Digital Systems AG. PrintNet PrintJob V2.04 User Manual. Sep. 5, 1994.
GMC Digital Systems AG. PrintNet Numbers V.1.1 Operating Manual. Jul. 4, 1994.
GMC Digital Systems AG. PrintNet PrintNumbers Operating Manual. Oct. 26, 1994.
GMC Digital Systems AG. PrintRobot Printmanager V2.00 βBedienungsanleitung. Feb. 17, 1993.
GMC Digital Systems AG. PrintRobot Printmanager Installation. Feb. 17, 1993.
GMC Digital Systems AG. PrintRobot: A European Premiére.
GMC Digital Systems AG. PrintManager V2.1 für PrintRobot Bedienumgsanleitung. Mar. 15, 1994.
GMC Digital Systems AG. Print Bar DLL PBAR0002 Code 2/5 Interleaved Technical Guidelines. Mar. 12, 1993.
IDG InfoWorld, Mar. 20, 1995, Product Reviews; Desktop publishing software; p. 92.
IDG InfoWorld, Oct. 9, 1995, Review, p. 91.
IDG InfoWorld, May 9, 1994, Review; p. 98.
Interquest, Ltd. FreeFlow Variable Information Workflow (white paper). 2004.
Labels & Labels. *New Generation of Digital Label Press Technology Available.* May/Jun. 1986.
McGilton, Henry and Campione, Mary. PostScript By Example. 1992. pp. 463-470.
McGraw-Hill, Inc., Business Week: *Information Processing: Data Processing.* Industrial Edition jun. 9, 1980.
McGraw-Hill, Inc., Business Week: *Product Design.* Industrial Edition. Jun. 20, 1977.
McGraw-Hill, Inc., IBM Dictionary of Computing; George McDaniel. 10th edition. 1993. p. 63.
Microsoft Press. Computer Dictionary. 3rd edition. 1997. pp. 53, 72, & 356.
Oxford University Press, dictionary of Computing: Defination of: "Page Description Language". 4th edition. 1996. p. 352.
Press Information Drupa '86. *GMC PrintRobot, the revolutionary new printing technology.* 1986.
Adobe Systems Inc. Postscript Language Reference Manual Supplement for Version 2014. Mar. 10, 1994.
Adobe Systems Inc. PostScript Language Reference Manual. 1st edition. 1985.
Adobe Systems Inc. PostScript Language Reference Manual. 2nd edition. 1990. pp. 708-765.
Adobe Systems Inc. PostScript Language Reference Manual. 3rd edition. 1999. pp. 1-293.
Adobe Systems Inc. PostScript Language: Tutorial and Cookbook. 1986.
Adobe Systems Inc. Programming The Display PostScript System with NeXTstep. 1991. pp. 372-380.
Bhushan, Abhay & Plass, Michael, The Interpress page and document description language, Computer Magazine Jun. 1986.
Braswell, Frank Merritt. Inside PostScript. 1989. pp. 14-10-Appendix III-23.
Haxton, K. Xerox The Document Company: Variable Information Printing, *From 1977 to today, Leading in Information Age Printing.* 2005.
Holzgang, David A. Display PostScript Programming. 1990. pp. 225-325.
Notice of Prior Litigation Allegations. Jan. 2007.
Reid, Glenn C., Adobe Systems Inc. PostScript Language Program Design. 1998.
Xerox Corp. Technical Tutorial. Sep. 19, 2005.
Adobe Systems Inc. PostScript Language Reference Manual. 3rd edition. 2002.
Adobe Systems Inc. PostScript language Tutorial and Cookbook. 1985.
Holzgang, David A. Understanding PostScript Programming. 3rd ed. 1992. pp. 268-269.
IBM Corp. *Attribute Specification in a Structured Data Stream.* IBM Technical Disclosure Bulletin [online]. Jan. 18, 1995 [retrieved Nov. 20, 2006]. Retrieved from the Internet:<URL: http://www.IP.com>.
IBM Corp. *Document Environment Hierarchy.* IBM Technical Disclosure Bulletin. Sep. 1, 1988.
IBM Corp. *Dynamic Repositioning of Object Areas on a Page.* IBM Technical Disclosure Bulletin, vol. 32, No. 10B. Mar. 1990.
IBM Corp. *Enhanced Technique for Merging Data From a Second Document.* IBM Technical Disclosure Bulletin, vol. 30, No. 5 Oct. 1987.
IBM Corp. *Enhanced Data Merge Source For Shell Document.* IBM Technical Disclosure Bulletin, vol. 32, No. 12. May 1990.
IBM Corp. *Form Overlay Print System Using Postscript.* IBM Technical Disclosure Bulletin [online], vol. 39 No. 2. [retrieved Nov. 20, 2006]. Retrieved from the Internet:<URL: http://www.IP.com>.
IBM Corp. *Identifying and Optimizing PostScript Variable Data*: IBM Technical Disclosure Bulletin [online], vol. 40 No. 9. [retrieved Nov. 20, 2006]. Retrieved from the Internet:<URL: http://www.IP.com>.
IBM Corp. *Improved Technique for Printing Multi-Copy Documents.* IBM Technical Disclosure Bulletin, vol. 29, No. 1. Jun. 1986.
IBM Corp. *Method for Automatically Printing Variable Content Labels On-Line.* IBM Technical Disclosure Bulletin, vol. 33, No. 8. Jan. 1991.

IBM Corp. *Method for Combining Variable and Fixed Print Data in a Print Image*. IBM Technical Disclosure Bulletin [online], vol. 36, No. 10. Oct. 1993 [retrieved Nov. 20, 1006]. Retrieved from the Internet:<URL: http://www.IP.com>.

IBM Corp. *Method for Joining Documents for Printing in a Personal Computer System*. IBM Technical Disclosure Bulletin, vol. 29 No. 7. Dec. 1986.

IBM Corp. *Method to Merge Table data Using One-Cell Table Objects*. IBM Technical Disclosure Bulletin, Document No. 86A 61235/85-130 P200/AT8840660. May 1986.

IBM Corp. *Registered Name Identification and Variable Names*. IBM Technical Disclosure Bulletin, vol. 32, No. 9B, Feb. 1990.

IBM Corp. *Using PostScript Resources in Advanced Function Printing*. IBM Technical Disclosure Bulletin, vol. 38, No. 1. Jan. 1995 [retrieved Nov. 20, 2006]. Retrieved from the Internet:<URL: http://www.IP.com>.

IBM Corp. *Variable Paged Array Datatype*. IBM Technical Disclosure Bulletin, vol. 37, No. 7. Jul. 1994 [retrieved Nov. 20, 2006]. Retrieved from the Internet:<URL: http://www.IP.com>.

IBM Corp. *Word Processor Having Conditional Text Printing for Mass Mailings*. IBM Technical Disclosure Bulletin, vol. 29, No. 6. Nov. 1986 [retrieved Nov. 20, 2006]. Retrieved from the Internet:<URL: http://www.IP.com>.

Reid, Glenn C. Thinking in PostScript. 1990.

Sherman, John F. Taking Advantage of PostScript (1992).

PCT International Search Report for International Application No. PCT/US99/26440. May 7, 2000.

Adobe Developer Support. Emulation of the Execform Operator. Technical Note #5113. Mar. 31, 1992.

Adobe Developer Support. using EPS Files in PostScript Language Forms. Technical Note #5144. Oct. 4, 1996.

Adobe Systems Inc. PostScript Language Program Design. Feb. 1988.

Adobe Systems Inc. PostScript Language Reference Manual. 2nd edition. 1990. pp. 16, 17, 55, 56, 146, 147, 157, 158, 172 & 173.

GMC Digital Systems AG. Print Bar DLL PBAR0004 Code 39 Technical Guidelines. Apr. 7, 1993.

GMC Digital Systems AG. Print Bar DLL PBAR0006 Code 128 Technical Guidelines. Apr. 7, 1993.

GMC Digital Systems AG. Print Layout-A Short Overview vol. 1. Dec. 1990.

GMC Digital Systems AG. PrintManager V 2.1 für PrintRobot Installation. Jun. 15, 1994.

GMC Digital Systems AG. PrintManager V 2.11 for Print Robot Operating Manual. Sep. 1, 1994.

GMC Digital Systems AG. PrintNet Brochures.

GMC Digital Systems AG. PrintNet PrintBar Operating Manual. Feb. 26, 1993.

GMC Digital Systems Ag. PrintNet PrintBar V1.01 User Manual. Aug. 23, 1994.

GMC Digital Systems AG. PrintNet PrintFont for Windows Operating Manual. Mar. 29, 1993.

GMC Digital Systems AG. PrintNet PrintFont V2.1 User Manual. Oct. 26, 1994.

GMC Digital Systems AG. PrintNet PrintImage User Manual. Oct. 26, 1994.

GMC Digital Systems AG. PrintNet PrintLayout Operating Manual. Feb. 26, 1993.

GMC Digital Systems AG. PrintNet PrintLayout II Bedienungsanleitung. Mar. 31, 1993.

Xerox Corp. System Intergration Guide, Interpress 82 Reader's Guide, Jerry Mandelson Apr. 1984.

Xerox Corp. The Leading Edge & Internal Memo from R.V. Adams of Jun. 1, 1977 & 9700 Electronic Printing System, El segundo, California.

Xerox Corp. The Leading Edge & Letter from R.V. Adams & 9700 Electronic Printing System, El Segundo, California.

Xerox Corp. Xerox Generic Format ("XGF") Command Set for DocriPrint (draft). Version 1.2. Jul. 1, 1993.

Xerox Corp. Xerox Generic Format ("XGF") Command Set for DocuPrint (draft). Version 1.2a. Aug. 24, 1993.

Xerox Corp. Xerox Generic Format ("XGF") Command Set for DocuPrint. (draft) Version 1.1a. Jun. 14, 1993.

Xerox Corp. Xerox Generic Format ("XGF") Command set for DocuPrint. Version 1.3. 1993.

Xerox Corp. Xerox Generic Format ("XGF") Reference Manual. Version 1.3a. Jun. 1994.

Xerox Corp. Xerox Generic Format ("XGF") Reference Manual. Version 1.4. Jun. 1995.

Xerox Corp. Xerox Generic Format XGF Presentation and Training Manual—R.XCH. Rel 1.3. Dec. 1993.

Xerox Corp. Xerox Interpress Toolkit Software, Sunnyvale, California 1986.

Xerox VIPP Technical Reference Manual.

Adobo Systems Inc. Programming the Display PostScript System with X. 1993.

Glover, Gary. Running PostScript from MS-DOS. 1st edition. 1989.

Harrington, Steven I. and Buckley, Robert R. Interpress-The Source Book. 1988.

Xerox Corp. Introduction to Interpress. Apr. 1994.

\* cited by examiner

METHOD OF UTILIZING VARIABLE DATA FIELDS WITH A PAGE DESCRIPTION LANGUAGE

CROSS REFERENCE TO RELATED APPLICATIONS

This application is a continuation of U.S. patent application Ser. No. 10/090,529 filed Mar. 1, 2002, and issued as U.S. Pat. No. 6,687,016; which is a divisional of U.S. patent application Ser. No. 09/299,502 filed Apr. 26, 1999, and issued as U.S. Pat. No. 6,381,028; which is a continuation of U.S. patent application Ser. No. 08/896,899, filed Jul. 18, 1997, and issued as U.S. Pat. No. 5,937,153; which is a continuation-in-part of U.S. patent application Ser. No. 08/373,582, filed Jan. 18, 1995, and issued as U.S. Pat. No. 5,729,665.

BACKGROUND OF INVENTION

The present invention relates to the high-speed printing industry, and more particularly, to a method for printing variable data using a page description language in a high-speed printing environment.

Application programs, such as Adobe Illustrator®, typically include a program which generates a specification of a screen or page's contents in a page description language. The specification, or page description code, provides instructions as to how to generate the image in a printer. The page description code is transferred from the application program to a printer, where it is executed to generate a bit map of the page. The most commonly used page description language is PostScript®, which is a machine independent language produced by Adobe Systems, Inc.

An application program page typically contains a number of data areas with either graphic or alphanumeric data. The PostScript language includes commands that define or build "graphics states" for each of the data areas on the page. These graphics states are sets of default attributes such as angle, scale factor, type-font, location, etc., which define how data is to appear on the page. Often, multiple graphics states are defined for a single page, with the different graphic states corresponding to different data areas on the page. Examples of commands that are used in PostScript to build a graphics state are: 20 rotate,/Times-Roman findfont, 14 scalefont, and setfont. In addition to commands which build graphics states, PostScript specifications also include the graphic or alphanumeric data which is displayed in the data areas, as well as a print command such as "SHOW", which causes a bit map to be generated for the data.

In the past, page description languages, including PostScript, have only been used to print static data pages, because page description languages lack the functionality required for variable data printing. In variable data printing, each page shares a common background, and the displayed data in at least one data field changes for each page. Up until now, it has not been possible to print pages of variable data with page description languages such as PostScript, because the page description languages are unable to save page backgrounds and graphics states from a page specification, and are thus unable reuse the same background and graphics states when printing subsequent pages. Thus, with page description languages such as PostScript, whether the entire page is changed, or only a single item of data on the page is changed, a new page description language specification is generated to print each separate page.

For example, if thousands of copies of a mass mailing advertisement were to be printed, each copy being identical except for the recipient's name and address, it would be necessary to generate a new PostScript specification defining the page background, and the graphics states for the name and address fields, for each new name and address that is printed. Hence, to print 50 advertisements, it would be necessary to generate 50 PostScript specifications which each define virtually the same image.

In general, PostScript specifications are very complex and require extensive processing to generate and execute. Thus, generating a new PostScript specification each time a page of variable data is printed consumes an immense amount of processing time. In high-speed printing systems, it is typically the processing time, not the printer hardware, which determines the speed at which pages can be printed. Therefore, the processing required to repetitively redefine the same background and graphics states for each page of variable data significantly slows the entire printing system.

Due to the amount of processing time consumed in redefining the page template and graphics states for each new page of data that is printed, as well as the resultant effect on printing speed, it is desirable to have a method for processing variable data wherein once defined, the template and graphics states for a page can be stored and reused for printing subsequent pages. Further, it is desirable to have a method for printing variable data which is compatible with existing printing systems and page description languages, such as PostScript, and which is capable of processing variable data in a high-speed industrial printing system.

SUMMARY OF INVENTION

It is an object of the present invention to provide a method for utilizing variable data with a page description language, which enables the template and graphics states for a page of variable data to be defined and stored; and which enables the stored graphics states to be associated with multiple items of variable data from a database or merge file; so that once stored, the graphics states can be repeatedly applied to the items of variable data to print multiple pages of variable data or multiple variable data bitmaps. Further, it is an object of the present invention to provide such a method which is compatible with existing page description languages, and which can be used in a high-speed industrial printing system.

The method of the present invention is implemented by means of a control task which executes in conjunction with a page description code interpretive program, such as a PostScript program, to identify variable data areas in the page description code specification, and reserve the graphics states for the variable data areas as they are defined by the specification. After the interpreter program has executed, a merge task is initiated. The merge task associates items of variable data from a data file with the reserved graphics states, generates a bit map for each variable data area, merges the bit maps with the page template, and outputs a complete bit map for the page. Accordingly, in the method of the present invention, bit maps for multiple pages of variable data are generated from a single page description language specification.

The present invention assumes the generation of a page specification in PostScript, or another similar page description language, by the application program, and the transfer of this specification to a printer. According to the present invention, a control task activates and monitors the PostScript interpreter program in the printer. As the interpreter executes, it defines graphics states for the data areas on the page. The PostScript attributes for a graphics state are stored in a stack as they are defined, so that at any given point in the code, the stack represents all of the PostScript attributes for the current graphics state.

When the control task identifies a print command in the code, the control task interrupts the interpreter to determine whether the data to be printed is variable data. If the data is variable, the current graphics state, consisting of the attributes then existing in the stack and job specific attributes which are defined in a job file, is linked to the data area and reserved in an internal database. Further, character bit maps are generated in accordance with the graphics state, and linked to and reserved with the graphics state. After the graphics state and character bit maps have been reserved, the PostScript interpreter is resumed at the line of code following the print command.

The interpreter continues executing until either the control task detects another print command, or the last line of code is reached. If a second print command is detected, the interpreter is interrupted again and the above steps repeated, to reserve the stack contents and job attributes for the second data area, and to generate and store a second set of character bit maps. The control task continues in this manner monitoring and interrupting the interpreter program, until all of the variable data areas on the page have been detected, and graphics states and possibly character bit maps for the variable data areas have been reserved in the database.

As the PostScript interpreter executes, a bit map of the non-variable background graphics and text, otherwise referred to as a "template", is generated for the page. At the last code command, which in PostScript is typically "SHOW-PAGE," the control task terminates the PostScript interpreter, and reserves the template in the database.

The merge task is then initiated to print variable data pages using the reserved page template, graphics states and character bit maps. The merge task begins by retrieving a merge file containing the variable data to be printed. After retrieving the merge file, the task identifies the correct template for the current page, and the names of the graphics states related to that template, from data in the merge file. Then, using the name of the first graphics state reserved for the template, the merge task retrieves the graphics state from the database and the character bit maps linked to that state. The merge task then retrieves data corresponding to that graphics state from the appropriate field in the merge file, and generates a bit map of the data in accordance with the graphics state and character bit maps. The merge task then merges the data bit map into the template. After the bit map has been generated and merged, the merge task identifies retrieves another graphics state for the template and repeats the process. If there are no more graphics states which correspond to variable data areas on the page, the merge task outputs the finished bit map for the page.

After the first page of data has been printed, the merge task retrieves a "clean" template from the database, and again identifies the graphics states for the page. The merge task then retrieves the next record of variable data from the database, and generates variable data bit maps for each of the fields in the record, in accordance with the reserved graphics states and character bit maps which correspond to each of the fields. The merge task continues in this manner, identifying variable data areas and generating bit maps for the variable data in the merge file, until a page has been printed for each variable data record in the file.

The method of the present invention is advantageous in that once the graphics states and template have been defined for a variable data page, they can be reused to print multiple pages of variable data with only a minimal amount of additional processing.

Accordingly, it is an object of the present invention to provide a method for printing variable data with a page description language; a method which increases the speed at which variable data pages can be printed; a method which enables the printing attributes for a page to be saved and used for printing multiple pages of data; and a method which is compatible with existing page description languages and printing systems.

Other objects and advantages of the present invention will be apparent from the following description, the accompanying drawings and the appended claims.

DETAILED DESCRIPTION

The present invention provides a computer-implemented method for reserving graphics states, which enables a page description language to be used for variable data printing. In accordance with the present invention, graphics states describing variable data areas are generated by a page interpreter program and reserved in an internal database. The graphics states are later accessed from the database and used for printing variable data pages. The method of the present invention can be employed with a conventional page description language, such as PostScript, to enable variable data pages to be printed with a minimum amount of processing.

Figure 1:
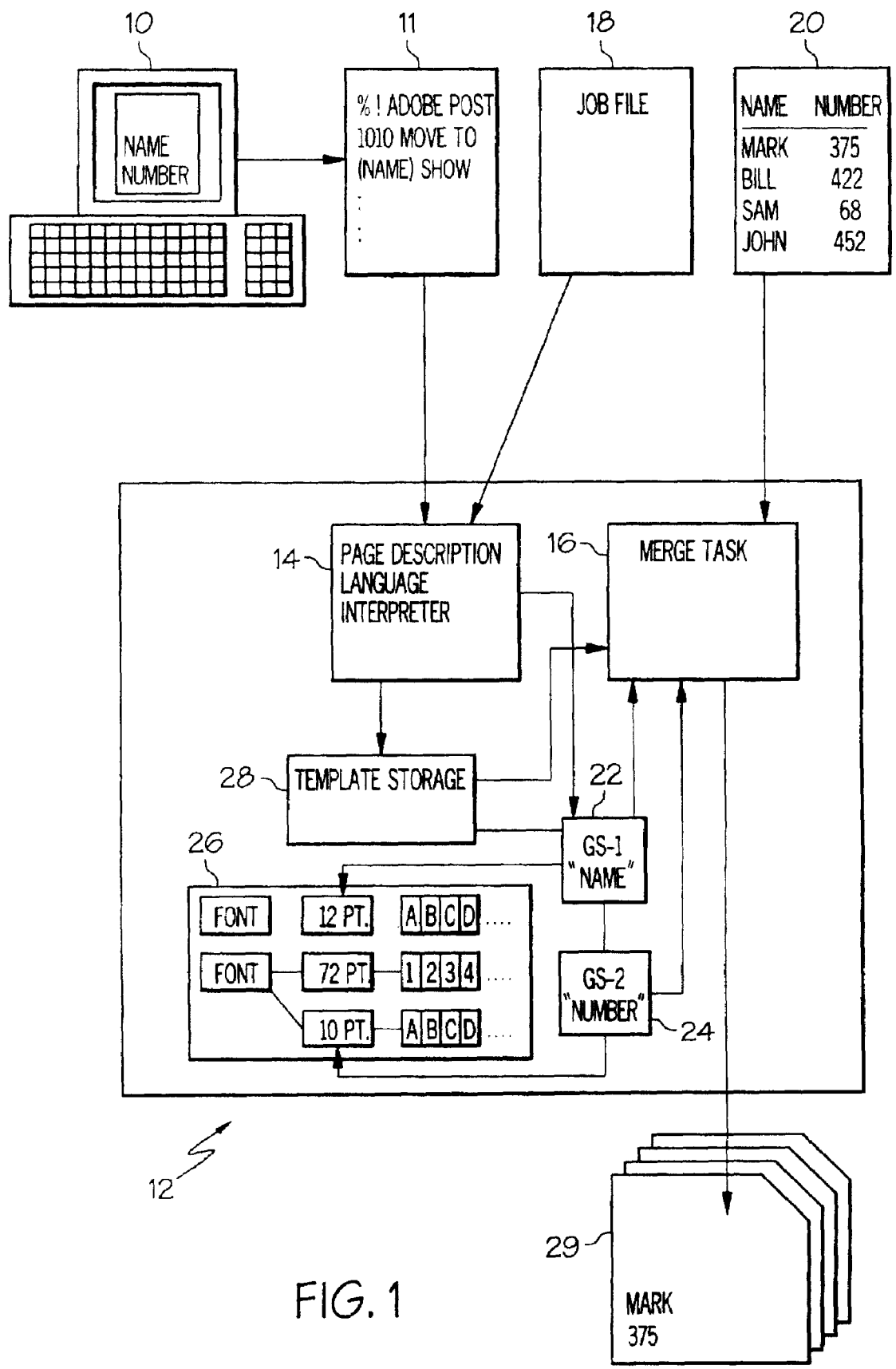
FIG. 1 is a data flow diagram illustrating the preferred embodiment of the method of the present invention.

As shown in FIG. 1, an image containing text and/or graphics data is created at a workstation 10, using a graphics application program such as Adobe Illustrator®. As the image is created, the application program displays the image on the workstation screen. When the image is complete and ready to be printed as a page, the application program generates a specification of the image in PostScript in a conventional manner.

After the PostScript file 11 is generated, it is transferred from the workstation 10 to a printer generally designated as 12. In the printer 12, a PostScript interpreter 14 is executed to generate a pagemap of the image. In the method of the present invention, a control task operates in the printer 12 to initiate the PostScript interpreter program 14 and a merge task 16. The control task is initiated upon power-on of the printer 12, and controls and coordinates the variable data printing.

As the PostScript interpreter 14 executes, it defines the PostScript graphics state attributes for the page. These attributes can include the size, font, position, orientation, and location in which the graphic or text data is to appear on the page. The specifics of the attributes which are available in PostScript to define how data is to appear on a page would be well-known to one skilled in the art. Therefore, further description of these PostScript attributes is not provided.

However, one of the PostScript attributes, namely the region, has been expanded in the present invention to allow for variable data printing. In the method of the present invention, the region attribute is used to define the boundaries or extent to which a variable data graphics state will be allowed to effect a page. The graphics state extent is an invisible boundary which acts as a clippath for the page, to prevent variable data for a particular graphics state from extending outside the intended boundaries of the graphics state. The region of the graphics state extent is defined without altering PostScript, by using an ordinary shape, which is created as part of the image, to define the region. In the present invention, the artist creates a shape representing the extent as part of the page image, and specifies a particular trigger color or gray scale for the shape. Thus, the artist could include a medium gray scale rectangle in the upper left-hand corner of the page, with the boundaries of the rectangle representing the extent which the artist has defined for the graphics state positioned at that corner of the page. The medium gray scale will then represent the trigger color, and will be specified as the trigger for the region attribute in a job file 18 in the printer 12.

In addition, a second parameter in the job file 18 can be used to specify whether the rectangle should appear on the page, or whether it is being used only to define a graphics state extent. Thus, if the artist also wants the medium gray scale rectangle to appear on the printed page, this parameter enables the color to act as a trigger, yet not inhibit the artist's design. When the rectangle is interpreted during the method of this invention, the control task will detect the trigger color and will save an "invisible" boundary represented by the rectangular as part of the graphics state.

As the PostScript attributes are defined, they are placed in a stack. When a new attribute is defined, it is added to the top of the stack. When an attribute is deleted, it is removed from the stack. The combination of all of the attributes located in the stack at any point during the execution of the PostScript interpreter 14 constitutes the "current" graphics state for the page.

When the interpreter reaches a print command, such as "SHOW" in PostScript, the command triggers the control task to interrupt the interpreter program. During this interruption, the control task interprets data in the PostScript file 11 and reserves a graphics state if the data is variable. Normally in a PostScript file, data which is to appear on the printed document is enclosed within parentheses. Thus, the control task identifies data in the file 11 by locating parentheses in the code.

After the control task identifies the data, it interprets the data to determine whether it is static data, which is to be part of the page template, or variable data. To interpret the data, the control task first reads the data located in the parentheses and compares the data with a list of literal data strings stored in the job file 18. The job file 18 contains a list of data strings which are each associated with the name of a graphics state and its corresponding data field in a merge file 20. In the preferred embodiment, the graphics state name is the same as the field name in the merge file 20. The merge file 20 contains variable data arranged in records, with each record corresponding to a different page. Each record contains one or more data fields, which each correspond to separate variable data areas on the page. The list of data strings and associated graphics state names is entered in the job file 18 by the print operator prior to initiating the print job. If the data from the PostScript file 11 matches a data string in the job file 18, the control task replaces the data from the file 11 with the graphics state name associated with the matching data string. In this manner, the control task transforms static data in the PostScript file into a variable data field, by substituting a graphics state field name for the static data in the file.

In a second embodiment, the graphics state name corresponding to the data area is defined directly within the PostScript file 11, by making the name part of the image that is created in the application program. In this embodiment, the name is enclosed within brackets in the file, such as "<<>>", to enable the control task to identify the data as defining a graphics state rather than being an ordinary data string. Thus, to define the graphics state "ADDRESS" within the PostScript file 11, the following would appear before a show command in the code: "(<<ADDRESS>>)". This second embodiment is advantageous in that it does not require the control task to compare the file data with a data list in the job file 18; however, it does require coordinating the graphics state and field names between the merge file 20 and the application program.

If the control task determines that the data corresponds to a variable area, it reads the current contents of the graphics state stack to determine the attributes to be used for printing data in that area. In addition to the PostScript attributes specified in the stack, the graphics state can also include attributes which are specifically tailored to variable data printing. These additional attributes can either appear after the graphics state name inside a "show" command, if the graphics state is defined directly in the PostScript file, or can be specified in the job file 18 prior to execution of the print job. These additional attributes specify how the variable data is to be positioned within the graphics state. The following is a list of the variable data attributes which can be specified for a print job: Name: A label used to identify the data to which the graphics state applies. A single datum may be inserted into more than one graphics state so this attribute is not unique to a single state.

Glyphs: A list of character glyphs, both attributes and images, which are available for use in the graphics state. (e.g. an alphabet of 72 point Times-Roman bold italic characters).

Static Data: Data to be used in the event that variable data is not available.

Identification: A number used to uniquely identify a graphics state.

Justification: How to handle the text left to right—left border, right border, centered or justified.

Alignment: How to place the text vertically in the graphics state. This could be top, bottom or centered.

Word Wrapping: Selects a word wrapping algorithm.

Dynamic Registration: Information on how to determine the registration from one page to the next.

Logic Mode: The manner in which the bitmap merge takes place. This is one of seven binary combination techniques.

DP Procedure: A procedure (or program) used to manipulate the variable data just before the graphics state is applied.

Data Selection: Which portions of the variable data to use.

Underline: Selects underlined text.

When the control task is triggered to reserve a graphics state, the above listed attributes, if specified, are combined with the PostScript attributes from the stack, and reserved as a single graphics state under the name obtained from the PostScript file 11 or the job file 18 such as shown at 22.

After the control task has compiled the attributes for the current graphics state, it may instruct PostScript to generate a font cache 26 for the graphics state. The font cache 26 consists of a character bit map for each of the alphanumeric characters A–Z and 0–9 generated in the font specified in the graphics state. After PostScript has generated all of the character bit maps, and placed the bit maps in the font cache 26, the font cache is linked to the graphics state 22, and reserved in the database. After the control task has reserved the current graphics state 22 and the font cache 26 in the database, it resumes execution of the PostScript interpreter 14 at the first line of code after the print or "SHOW" command, so that the print command is not executed.

After the interpreter is resumed, it continues defining graphics state attributes for the page, until the control task detects another print or "SHOW" command. Upon detecting another print command, the control task again interrupts execution of the interpreter, and determines whether the data in the PostScript file 11 corresponds to a variable data area. If the data corresponds to a variable data area, the control task again substitutes a graphics state name from the job file 18 for the data in the PostScript file 11, and reads the graphics state attributes from the stack and job file. The control task also instructs PostScript to generate another font cache, if the attributes of the current graphics state differ from the attributes of previously reserved graphics states. The current graphics state and font cache are then linked, and reserved in the database under the second graphics state name from the job file 18, such as shown at 24. If the data does not correspond to a variable data area, the control task resumes execution of the interpreter at the print command, so that a bit map for the data can be generated and added to the template.

At the final line of code, the template is complete, and incorporates all of the static text and graphic data that is to appear on the printed document. At this point, the control task terminates the interpreter, and saves the template to the database such as shown at 28. In PostScript, the control task is triggered to save the template by the "SHOW-PAGE" command.

Since the control task of the invention operates externally of the PostScript interpreter, the method of the present invention enables bit maps and graphics states to be generated by the interpreter in a conventional manner. However, rather than printing a completed page map at the end of the interpreter program, the method of this invention reserves the page maps, character bit maps and graphics states generated by the interpreter, in order that they may be subsequently accessed and used to print multiple pages of variable data.

After the interpreter has been terminated, the control task initiates the merge task 16. The merge task 16 interfaces between the merge file 20, which has been pre-programmed with items of variable data, and the database in which the templates, font caches and graphics states defined by the interpreter have been saved, in order to combine the variable data with a template on a single page map. The merge task 16 begins by accessing the merge file 20 to retrieve the name of the template for the page, and then retrieving the specified template from the database. In addition, the merge task 16 retrieves the names of the data fields and reserved graphics states which are associated with the selected template from the merge file 20.

Using the name corresponding to the first graphics state on the page, the merge task 16 accesses the merge file 20 and retrieves the data stored under that field name in the first data record. In the representative merge file 20 shown in FIG. 1, the field names are NAME and NUMBER.

After the merge task 16 has read the data corresponding to the designated field name, it retrieves the graphics state which was reserved under the same name, as well as the character bit maps which are linked to that graphics state. The merge task 16 then generates a bit map of the data in accordance with the graphics state attributes. After the bit map is generated, it is merged into the template at the region corresponding to the graphics state, by writing the data bit map over the existing template bit map.

It will be apparent to those of ordinary skill in the art that it is within the scope of the invention to write the data bit map over a clean page as opposed to the template bitmap. For example, if the template contains no static bitmap data, then it would not be necessary to save an empty bitmap of the template in the database as described above. Thus, it is within the scope of the invention that the PostScript file 11 defines only variable data areas and does not define any static data areas. Such a PostScript file is illustrated in FIG. 1.

After the data from the first field has been merged into the template, the merge task 16 reads the name corresponding to a second variable data area from the merge file 20, if a second variable area exists on the page. The merge task 16 then retrieves the graphics state and linked font cache having the same name as the second variable area. Next, using this name, the merge task 16 again accesses the merge file 20, and reads the data from the field of the same name. The merge task 16 then generates a bit map for the data in accordance with the graphics state and font cache, and again merges the data bit map into the template 28.

The merge task 16 continues the steps of identifying variable data areas for the template, retrieving graphics states and character bit maps corresponding to the variable areas, accessing variable data from the merge file 20, and generating bit maps for the variable data, until bit maps have been generated and merged for all of the variable data to be included on the page. When a bit map has been generated for each variable data area, and merged with the template 28, the pagemap is output for printing as shown at 29.

The merge task 16 then proceeds with printing a second page using the same template and graphics states, but a different variable data record in the merge file 20. To print the second page, the merge task 16 retrieves a "clean" template from the database. Next, the merge task 16 again identifies the name of the first variable data area for that template and retrieves the graphics state of the same name. Then, the merge task 16 reads the data for that field from the second record of the merge file 20, and generates a bit map of the data using the retrieved graphics state attributes and character bit maps. Once the bit map is generated, the merge task 16 merges the bit map into the template by writing the bit map over the template at the location defined by the graphics state.

The merge task 16 then continues processing in this manner until bit maps have been generated and merged into the template for all of the graphics states reserved for the page. After all of the bit maps for the second page have been merged into the template, the page is printed. The merge task 16 continues, repeating these steps for each record of data in the merge file 20, until all of the variable data records have been printed on a page.

Figure 2:
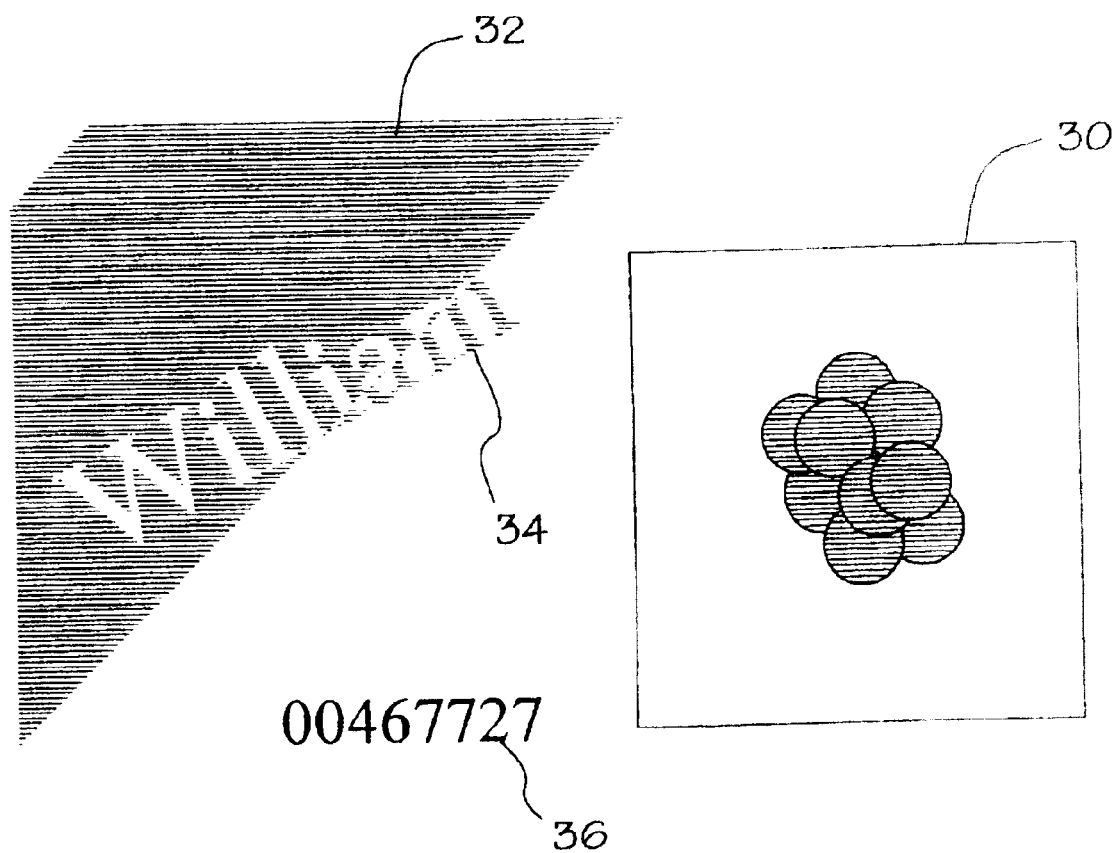
FIG. 2 is an example of a variable data page generated in accordance with the method of the present invention.

FIG. 2 shows a variable data page printed in accordance with the method of this invention. On this page, the data fields 30 and 32 are static fields which are part of the page template. The data field 34 containing the name "William" is a variable data field. Different names such as Mark or Sam, from the merge file 20, are printed in this field on subsequent pages. The font, angle and color contrast in which "William" is displayed are all aspects of the graphics state which were defined and stored during the steps of the present invention. Data field 36 which contains the number "00467727" is a second variable data area on the page. Again, the data displayed in this area varies on each page, depending upon the contents of the merge file 20.

While the method described constitutes a preferred embodiment of the invention, it is to be understood that the present invention is not limited to this precise form, and that variations may be made without departing from the scope of the invention.

What is claimed is:

1. A computer implemented method for generating a bitmap suitable for high-speed variable printing, comprising the steps of:
   providing a page description language file, the page description language file defining at least one variable data area and at least one static data area;
   interpreting the page description language file, and during the interpreting step, (a) generating a static bitmap of the static data area, (b) identifying the variable data area, and (c) responsive to the identification of the variable data area, not adding a bitmap of the variable data area to the static bitmap; and
   saving the static bitmap, whereby the saved static bitmap is used repeatedly in the generation of a plurality of documents, each of which contains the static bitmap and a variable data bitmap.

2. The computer implemented method of claim 1 further comprising the step of:
   providing a merge file including a plurality of variable data items and including a field name associated with the plurality of data items;
   wherein the step of identifying the variable data area during the interpreting step includes the step of detecting, in the page description language file, a character string associated with the variable data area that matches the field name.

3. The computer implemented method of claim 2, wherein the detecting step includes the step of identifying the character string bounded by at least one special character.

4. The computer implemented method of claim 1, further comprising the step of:
   providing a merge file including a plurality of variable data items;
   wherein the step of identifying the variable data area during the interpreting step includes the step of detecting, in the page description language file, a character string associated with the variable data area that is operatively linked to the plurality of variable data items.

5. The computer implemented method of claim 1, wherein the variable data area includes attribute definitions defining, at least in part, the manner in which variable data is to appear in the variable data area.

6. The computer implemented method of claim 5, wherein the attribute definition defines a list of character glyphs available for use in the variable data area.

7. The computer implemented method of claim 5, wherein the attribute definition defines static data to be printed in the event that variable data is not available.

8. The computer implemented method of claim 5, wherein the attribute definition defines a justification setting of variable data bitmaps to be printed in the variable data area.

9. The computer implemented method of claim 5, wherein the attribute definition defines vertical alignment of variable data bitmaps to be printed in the variable data area.

10. The computer implemented method of claim 5, wherein the attribute definition defines a wrapping algorithm for flowing variable data bitmaps in the variable data area.

11. The computer implemented method of claim 5, wherein the attribute defines a logic mode for merging the variable data bitmaps with static bitmap data.

12. A computer implemented method for generating a static bitmap suitable for high-speed variable printing, comprising the steps of:
   providing a page description language file, the page description language file defining at least one variable data area and at least one static data area;
   interpreting the page description language file, and during the interpreting step, generating a static bitmap of the static data area; and
   saving the static bitmap, whereby the saved static bitmap is used repeatedly in the generation of a plurality of documents, each of which contains the static bitmap and a variable data bitmap.

13. A computer implemented method for generating a static bitmap suitable for high-speed variable printing, comprising the steps of:
   providing a page description language file, the page description language file defining at least one variable data area and at least one static data area;
   interpreting the page description language file, and during the interpreting step, (a) generating a static bitmap of the static data area, (b) identifying the variable data area, and (c) responsive to the identification of the variable data area, not generating a bitmap of the variable data area; and
   saving the static bitmap, whereby the saved static bitmap is used repeatedly in the generation of a plurality of documents, each of which contains the static bitmap and a variable data bitmap.

14. A computer implemented method for generating a plurality of bitmaps suitable for high-speed printing, comprising the steps of:
   (a) providing a page description language file, the page description language file defining at least one variable data area and at least one static data area;
   (b) providing a merge file including a plurality of variable data items;
   (c) processing the page description language file, and during the processing step, generating a static bitmap of the static data area and associating the variable data area with the plurality of variable data items; and
   (d) saving the static bitmap;
   (e) generating a first variable data bitmap of a first one of the variable data items utilizing a graphics state associated with the variable data area;
   (f) merging the first variable data bitmap with a copy of the static bitmap to produce a first output bitmap;
   (g) generating a next variable data bitmap of a next one of the variable data items utilizing a graphics state associated with the variable data area; and
   (h) merging the next variable data bitmap with a copy of the static bitmap to produce a next output bitmap; and
   (i) repeating steps (g)–(h) for remaining variable data items in the plurality of variable data items.

* * * * *